US011659451B2

(12) United States Patent
Zhu et al.

(10) Patent No.: US 11,659,451 B2
(45) Date of Patent: May 23, 2023

(54) SERVING GATEWAY CONTROL PLANE FUNCTION TO MANAGE A PLURALITY OF SERVING GATEWAY USER PLANE FUNCTIONS, AND MOBILITY MANAGEMENT ENTITY TO COMMUNICATE WITH THE SAME

(71) Applicant: Telefonaktiebolaget LM Ericsson (publ), Stockholm (SE)

(72) Inventors: Jinyin Zhu, Shanghai (CN); Juying Gan, Shanghai (CN); Yunjie Lu, Shanghai (CN); Wenliang Xu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 128 days.

(21) Appl. No.: 17/047,284

(22) PCT Filed: Apr. 16, 2019

(86) PCT No.: PCT/CN2019/082894
§ 371 (c)(1),
(2) Date: Oct. 13, 2020

(87) PCT Pub. No.: WO2019/205991
PCT Pub. Date: Oct. 31, 2019

(65) Prior Publication Data
US 2021/0153080 A1 May 20, 2021

(30) Foreign Application Priority Data
Apr. 27, 2018 (WO) ............... PCT/CN2018/084751

(51) Int. Cl.
*H04W 36/00* (2009.01)
*H04W 36/08* (2009.01)
*H04W 36/32* (2009.01)

(52) U.S. Cl.
CPC ... *H04W 36/0022* (2013.01); *H04W 36/0016* (2013.01); *H04W 36/08* (2013.01); *H04W 36/32* (2013.01)

(58) Field of Classification Search
CPC ......... H04W 36/0022; H04W 36/0016; H04W 36/08; H04W 36/32; H04W 88/16;
(Continued)

(56) References Cited

U.S. PATENT DOCUMENTS

2017/0126618 A1\* 5/2017 Bhaskaran .......... H04L 61/5014
2017/0142682 A1 5/2017 Gunnarsson et al.
(Continued)

FOREIGN PATENT DOCUMENTS

| CN | 106912012 A | 6/2017 |
| CN | 107969017 A | 4/2018 |

(Continued)

OTHER PUBLICATIONS

International Search Report dated Jun. 27, 2019 for International Application No. PCT/CN2019/082894 filed on Apr. 16, 2019, consisting of 7—pages.

(Continued)

*Primary Examiner* — Michael Y Mapa
(74) *Attorney, Agent, or Firm* — Christopher & Weisberg, P.A.

(57) ABSTRACT

The present disclosure relates to a serving gateway control plane function to manage a plurality of serving gateway user plane functions, and a mobility management entity to communicate with the serving gateway control plane function. Embodiments may provide a method for the serving gateway control plane function. The method includes: connecting with the plurality of serving gateway user plane functions; storing serving area information of the plurality of serving gateway user plane functions; selecting a first serv- (Continued)

ing gateway user plane function among the plurality of serving gateway user plane functions for a user equipment, according to location of the user equipment and the serving area information of the plurality of serving gateway user plane functions; and sending serving area information of the first serving gateway user plane function to a mobility management entity.

12 Claims, 18 Drawing Sheets

(58) Field of Classification Search
CPC ............ H04W 36/0011; H04W 36/12; H04W 48/18; H04W 4/02; H04W 8/02
USPC ...... 370/331, 252; 455/434–445, 450–452.1, 455/464, 515
See application file for complete search history.

(56) References Cited

U.S. PATENT DOCUMENTS

| | | |
|---|---|---|
| 2017/0208634 A1 | 7/2017 | Bharatia et al. |
| 2018/0184323 A1 | 6/2018 | Xiong |
| 2018/0295659 A1* | 10/2018 | Shan ................ H04W 4/24 |
| 2018/0367953 A1* | 12/2018 | Shimizu ............ H04W 4/029 |

FOREIGN PATENT DOCUMENTS

| | | | |
|---|---|---|---|
| WO | 2017125179 A1 | 7/2017 | |
| WO | WO-2017125179 A1 * | 7/2017 | ............ H04L 41/12 |

OTHER PUBLICATIONS

EPO Communication and Supplementary European Search Report dated Jan. 31, 2022 for Patent Application No. 19793037.3, consisting of 12—pages.
3GPP TR 23.714 V14.0.0; 3rd Generation Partnership Project; Technical Specification Group Services and System Aspects; Study on control and user plane separation of EPC nodes (Release 14), Jun. 2016, consisting of 87—pages.
3GPP TS 23.214 V15.2.0; 3rd Generation Partnership Project; Technical Specification Group Services and System Aspects; Architecture enhancements for control and user plane separation of EPC nodes; Stage 2 (Release 15), Mar. 2018, consisting of 92—pages.

* cited by examiner

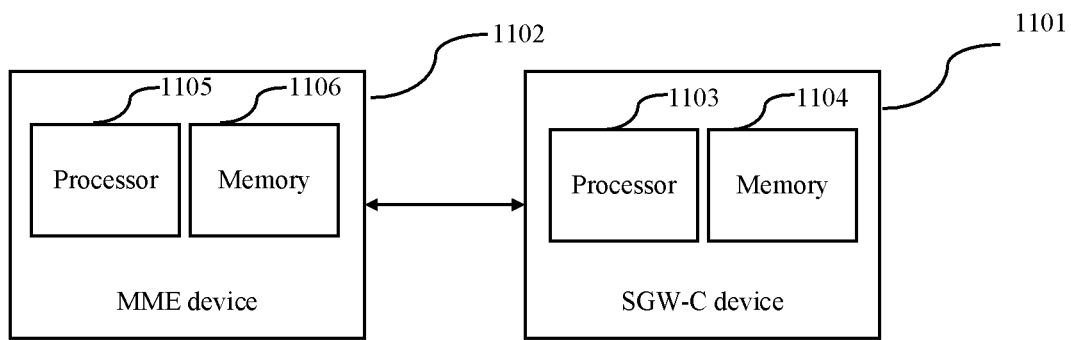

Figure 11

```
┌─────────────────────────────────────┐
│              1200                   │
│     Virtual Apparatus for SGW-C     │
│  ┌───────────────────────────────┐  │
│  │           1201                │  │
│  │      Connection Unit          │  │
│  └───────────────────────────────┘  │
│  ┌───────────────────────────────┐  │
│  │           1202                │  │
│  │        Storage Unit           │  │
│  └───────────────────────────────┘  │
│  ┌───────────────────────────────┐  │
│  │           1203                │  │
│  │        SelectionUnit          │  │
│  └───────────────────────────────┘  │
│  ┌───────────────────────────────┐  │
│  │           1204                │  │
│  │     Communication Unit        │  │
│  └───────────────────────────────┘  │
└─────────────────────────────────────┘
```

Figure 12

```
┌─────────────────────────────────────┐
│              1300                   │
│     Virtual Apparatus for MME       │
│  ┌───────────────────────────────┐  │
│  │           1301                │  │
│  │     Communication Unit        │  │
│  └───────────────────────────────┘  │
└─────────────────────────────────────┘
```

Figure 13

SERVING GATEWAY CONTROL PLANE FUNCTION TO MANAGE A PLURALITY OF SERVING GATEWAY USER PLANE FUNCTIONS, AND MOBILITY MANAGEMENT ENTITY TO COMMUNICATE WITH THE SAME

CROSS-REFERENCE TO RELATED APPLICATIONS

This application is a Submission Under 35 U.S.C. § 371 for U.S. National Stage Patent Application of International Application No.: PCT/CN2019/082894, filed Apr. 16, 2019 entitled "SERVING GATEWAY CONTROL PLANE FUNCTION TO MANAGE A PLURALITY OF SERVING GATEWAY USER PLANE FUNCTIONS, AND MOBILITY MANAGEMENT ENTITY TO COMMUNICATE WITH THE SAME," which claims priority to International Application No.: PCT/CN2018/084751, filed Apr. 27, 2018, the entireties of both of which are incorporated herein by reference.

TECHNICAL FIELD

The present disclosure relates generally to the technology of wireless communication, and in particular, to serving gateway control plane function to manage a plurality of serving gateway user plane functions, and mobility management entity to communicate with the same.

BACKGROUND

As the development of the core network of a wireless communication system, a technology of control and user plane separation (CUPS) is proposed.

Such as in a 3rd generation partner project technical specification 23.214 (3GPP TS 23.214), terminologies "SGW-C service area", "SGW-U service area" are used for CUPS. "SGW-C service area" means a service area of a serving gateway control plane function (SGW-C), and "SGW-U service area" means a service area of a serving gateway user plane function (SGW-U).

In this document, a SGW-C service area in CUPS is equivalent to the SGW service area without CUPS. A SGW-U service area in CUPS refers to an area within which a user equipment (UE) may be served by the same SGW-U, thus there is no need to change the SGW-U for the UE in the SGW-U Service Area. The SGW-U Serving Area is known in a SGW-C by means of local configuration or by means of a query of domain name system (DNS query).

As to the separated SGW-U and SGW-U, the SGW-U service area may be smaller than the SGW-C service area. In a 3rd generation partner project technical specification 23.214 (3GPP TS23.214), one implement solution is proposed. The SGW-C can be partitioned into multiple SGW-C partitions. Each of the SGW-C partition is aligned with the corresponding SGW-U service area. The mobility management entity (MME) treats the SGW-C partition as a traditional SGW without CUPS.

With this function, there will be no additional functional requirement on MME, since the serving area of SGW-C partition and the service area of SGW-U are aligned and MME just treat each SGW-C partition as a separate SGW.

However, such solution may increase an implementation complexity in SGW-C. The complexity resides in how to define the partition, how to manage each partition, how to share the resources (e.g. computing, memory) among the partitions. The function also impacts the DNS server configuration.

SUMMARY

Certain aspects of the present disclosure and their embodiments may provide solutions to these or other challenges. There are, proposed herein, various embodiments which address one or more of the issues disclosed herein.

A first aspect of the present disclosure provides a method for a serving gateway control plane function to manage a plurality of serving gateway user plane functions. The methods includes: connecting with the plurality of serving gateway user plane functions; storing serving area information of the plurality of serving gateway user plane functions; selecting a first serving gateway user plane function among the plurality of serving gateway user plane functions for a user equipment, according to location of the user equipment and the serving area information of the plurality of serving gateway user plane functions; and sending serving area information of the first serving gateway user plane function to a mobility management entity.

In embodiments of the present disclosure, the method further includes: receiving, from the mobility management entity, a request for changing the first serving gateway user plane function; reselecting a second serving gateway user plane function from the plurality of serving gateway user plane functions; sending serving area information of the second serving gateway user plane function to the mobility management entity; and deleting a session with the first serving gateway user plane function.

In embodiments of the present disclosure, the request for changing the first serving gateway user plane function is a modify bearer request. The serving area information of the second serving gateway user plane function is sent in a modify bearer response message. The step of deleting a session with the first serving gateway user plane function includes: sending a packet forwarding control plane session deletion request to the first serving gateway user plane function; and receiving a packet forwarding control plane session deletion response from the first serving gateway user plane function.

In embodiments of the present disclosure, the method further includes: receiving an indication of not to notify a packet data network gateway from the mobility management entity, in response to that the reselection of the second serving gateway user plane function happens during a preparation phase of a handover procedure.

In embodiments of the present disclosure, the handover is a S1-based handover or an inter-radio access technology handover.

In embodiments of the present disclosure, the method further includes: receiving an indication of to notify a packet data network gateway from the mobility management entity, in response to that the reselection of the second serving gateway user plane function happens during an idle mode mobility procedure, or during a completion phase of a handover procedure.

In embodiments of the present disclosure, the handover is an X2-based handover.

In embodiments of the present disclosure, serving area information of the first serving gateway user plane function is sent in a create session response message.

In embodiments of the present disclosure, serving area information of a serving gateway user plane function includes a list of tracking areas served by the serving gateway user plane function.

A second aspect of the present disclosure provides a method for a mobility management entity to communicate with a serving gateway control plane function managing a plurality of serving gateway user plane functions. The method includes: sending, to the serving gateway control plane function, a request to create a session; and receiving serving area information of a first serving gateway user plane function from the serving gateway control plane function. The serving gateway control plane function selects the first serving gateway user plane function among the plurality of serving gateway user plane functions for a user equipment, according to location of the user equipment and the serving area information of the plurality of serving gateway user plane functions.

In embodiments of the present disclosure, the method further includes: sending, to the serving gateway control plane function, a request for changing the first serving gateway user plane function, in response to that the user equipment moves out of a serving area of the first serving gateway user plane function; and receiving, from the serving gateway control plane function, serving area information of a second serving gateway user plane function. The second serving gateway user plane function is reselected by the serving gateway control plane function.

In embodiments of the present disclosure, the request for changing the first serving gateway user plane function is a modify bearer request. The modify bearer request includes user location information. The serving area information of the second serving gateway user plane function is received in a modify bearer response message.

In embodiments of the present disclosure, the method further includes: sending an indication of not to notify a packet data network gateway to the serving gateway control plane function, in response to that the reselection of the second serving gateway user plane function happens during a preparation phase of a handover procedure.

In embodiments of the present disclosure, the handover is a S1-based handover or an inter-radio access technology handover.

In embodiments of the present disclosure, the method further includes: sending an indication of to notify a packet data network gateway to the serving gateway control plane function, in response to that the reselection of the second serving gateway user plane function happens during an idle mode mobility procedure, or during a completion phase of a handover procedure.

In embodiments of the present disclosure, the handover is an X2-based handover.

In embodiments of the present disclosure, the further includes: sending the serving area information of the first or the second serving gateway user plane function to another mobility management entity, during changing of the mobility management entity communicating with the serving gateway control plane function.

In embodiments of the present disclosure, the serving area information of the first or the second serving gateway user plane function is sent in a context response or a forward relocation request.

In embodiments of the present disclosure, the serving area information of the first serving gateway user plane function is received in a create session response message.

In embodiments of the present disclosure, serving area information of a serving gateway user plane function of the plurality of serving gateway user plane functions includes tracking areas served by the serving gateway user plane function. The mobility management entity builds a tracking area list for the user equipment, based on the serving area information of the serving gateway user plane function.

A third aspect of the present disclosure provides a serving gateway control plane function device to manage a plurality of serving gateway user plane functions. The serving gateway control plane function device includes: a processor; and a memory. The memory contains instructions executable by the processor. The serving gateway control plane function device is operative to: connect with the plurality of serving gateway user plane functions; store serving area information of the plurality of serving gateway user plane function; select a first serving gateway user plane function for a user equipment; and send serving area information of the first serving gateway user plane function to a mobility management entity. The serving gateway control plane function device selects the first serving gateway user plane function from the plurality of serving gateway user plane functions, based on a location of the user equipment and the serving area information of the plurality of serving gateway user plane functions.

In embodiments of the present disclosure, the serving gateway control plane function device is further operative to: receive, from the mobility management entity, a request for changing the first serving gateway user plane function; reselect a second serving gateway user plane function from the plurality of serving gateway user plane functions; send serving area information of the second serving gateway user plane function to the mobility management entity; and delete a session with the first serving gateway user plane function.

In embodiments of the present disclosure, the request for changing the first serving gateway user plane function is a modify bearer request. The serving area information of the second serving gateway user plane function is sent in a modify bearer response message. The step of to delete a session with the first serving gateway user plane function includes: send a packet forwarding control plane session deletion request to the first serving gateway user plane function; and receive a packet forwarding control plane session deletion response from the first serving gateway user plane function.

In embodiments of the present disclosure, the serving gateway control plane function device is further operative to: receive an indication of not to notify a packet data network gateway from the mobility management entity, in response to that the reselection of the second serving gateway user plane function happens during a preparation phase of a handover procedure.

In embodiments of the present disclosure, the handover is a S1-based handover or an inter-radio access technology handover.

In embodiments of the present disclosure, the serving gateway control plane function device is further operative to: receive an indication of to notify a packet data network gateway from the mobility management entity, in response to that the reselection of the second serving gateway user plane function happens during an idle mode mobility procedure, or during a completion phase of a handover procedure.

In embodiments of the present disclosure, the handover is an X2-based handover.

In embodiments of the present disclosure, the serving area information of the first serving gateway user plane function is sent in a create session response message.

In embodiments of the present disclosure, the serving area information of a serving gateway user plane function includes a list of tracking areas served by the serving gateway user plane function.

A fourth aspect of the present disclosure provides a mobility management entity device to communicate with a serving gateway control plane function managing a plurality of serving gateway user plane functions. The mobility management entity device includes: a processor; and a memory, the memory containing instructions executable by the processor. The mobility management entity device is operative to: receive serving area information of a first serving gateway user plane function from the serving gateway control plane function. The serving gateway control plane function selects the first serving gateway user plane function for a user equipment. The serving gateway control plane function selects the first serving gateway user plane function from the plurality of serving gateway user plane functions, based on a location of the user equipment and the serving area information of the plurality of serving gateway user plane functions.

In embodiments of the present disclosure, the mobility management entity device is further operative to: send, to the serving gateway control plane function, a request for changing the first serving gateway user plane function, in response to that the user equipment moves out of a serving area of the first serving gateway user plane function; and receive, from the serving gateway control plane function, serving area information of a second serving gateway user plane function. The second serving gateway user plane function is reselected by the serving gateway control plane function.

In embodiments of the present disclosure, the request for changing the first serving gateway user plane function is a modify bearer request. The modify bearer request includes user location information. The serving area information of the second serving gateway user plane function is received in a modify bearer response message.

In embodiments of the present disclosure, the mobility management entity device is further operative to: send an indication of not to notify a packet data network gateway to the serving gateway control plane function, in response to that the reselection of the second serving gateway user plane function happens during a preparation phase of a handover procedure.

In embodiments of the present disclosure, the handover is a S1-based handover or an inter-radio access technology handover.

In embodiments of the present disclosure, the mobility management entity device is further operative to: send an indication of to notify a packet data network gateway to the serving gateway control plane function, in response to that the reselection of the second serving gateway user plane function happens during an idle mode mobility procedure, or during a completion phase of a handover procedure.

In embodiments of the present disclosure, the handover is an X2-based handover.

In embodiments of the present disclosure, the mobility management entity device is further operative to: send the serving area information of the first or the second serving gateway user plane function to another mobility management entity, during changing of the mobility management entity communicating with the serving gateway control plane function.

In embodiments of the present disclosure, the serving area information of the first or the second serving gateway user plane function is sent in a context response or a forward relocation request.

In embodiments of the present disclosure, the serving area information of the first serving gateway user plane function is received in a create session response message.

In embodiments of the present disclosure, serving area information of a serving gateway user plane function of the plurality of serving gateway user plane functions includes tracking areas served by the serving gateway user plane function. The mobility management entity builds a tracking area list for the user equipment, based on the serving area information of the serving gateway user plane function.

A fifth aspect of the present disclosure provides a computer readable storage medium having a computer program stored thereon. The computer program is executable by a device to cause the device to carry out any of the above described methods.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 11 is a block diagram showing the serving gateway control plane function and the mobility management entity in accordance with some embodiments;

FIG. 12 is a schematic showing virtualization apparatus for SGW-C in accordance with some embodiments;

FIG. 13 is a schematic showing virtualization apparatus for MME accordance with some embodiments;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As below, specific solutions and embodiments of the present disclosure will be described with figures.

Figure 1:
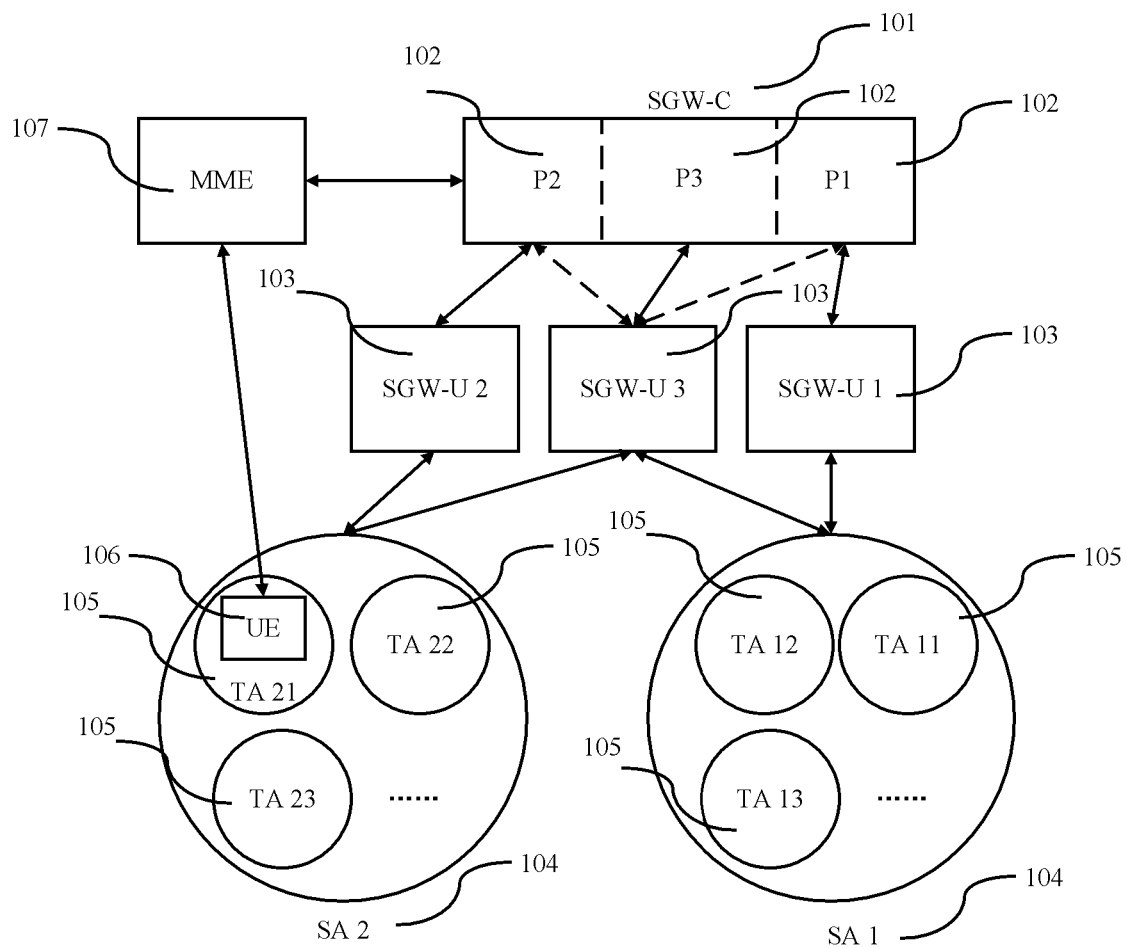
FIG. 1 is a schematic showing an example part of a network with CUPS.

FIG. 1 is a schematic showing an example part of a network with CUPS. As shown in FIG. 1, a SGW-C 101 manages a plurality of SWG-Us 103. The plurality of SWG-Us 103 serve a plurality of service area 104, including a plurality of tracking area 105. In the SWG-Us 103, a SGW-U1 serves a first service area SA1, and a SGW-U2 serves a second service area SA2. The SGW-C 101 may obtain a location of a user equipment 106 from a mobility management entity 107.

As in the existing 3GPP TS, for managing SWG-Us 103, the SGW-C may be partitioned into multiple SGW-C partitions 102. For example, a partition P1 is aligned to the SGW-U1, and a partition P2 is aligned to the SGW-U2. In such solution, there are several disadvantages as follows.

The network designs of the SGW-C and SGW-U are coupled closely. Whenever there is a SGW-U network redesign, e.g., service area change of SGW-U or introduction of new SGW-U serving a different area, the SGW-C network needs a redesign. For example, if a SGW-U3 is introduced, a new SGW-C partition P3 may be created. Alternatively, the existing SGW-C partition P1 and SGW-C partition P2 may be combined for the SGW-U3. In either manner, the SGW-C network needs a redesign.

SGW-C needs to be further developed to support the partition function. An implementation complexity in SGW-C may be greatly increased both in hardware and software.

Capital expenditures (CAPEX) and operational expenditures (OPEX) of SGW-C increase. With partition function, additional resource might be needed to serve the same number of users, since the resources may not be able to be shared among all partitions to the maximum extent. Besides, additional cost is needed to operate the increased number of SGW-C partitions.

Extra signaling in network are needed for switching of SGW-C partition. When UE moves between SGW-C partition, more signaling is introduced, e.g., the domain name system (DNS) procedure signaling and the signaling towards old SGW-C partition. The situation becomes worse when SGW-C partition needs to be changed while the SGW-U can be kept, i.e., in case the current SGW-U can serve a wider area than any existing SGW-C partition (P1 or P2) (e.g. as shown in FIG. 1, when the SGW-U 3 is aligned to P1 and P2).

Figure 2:
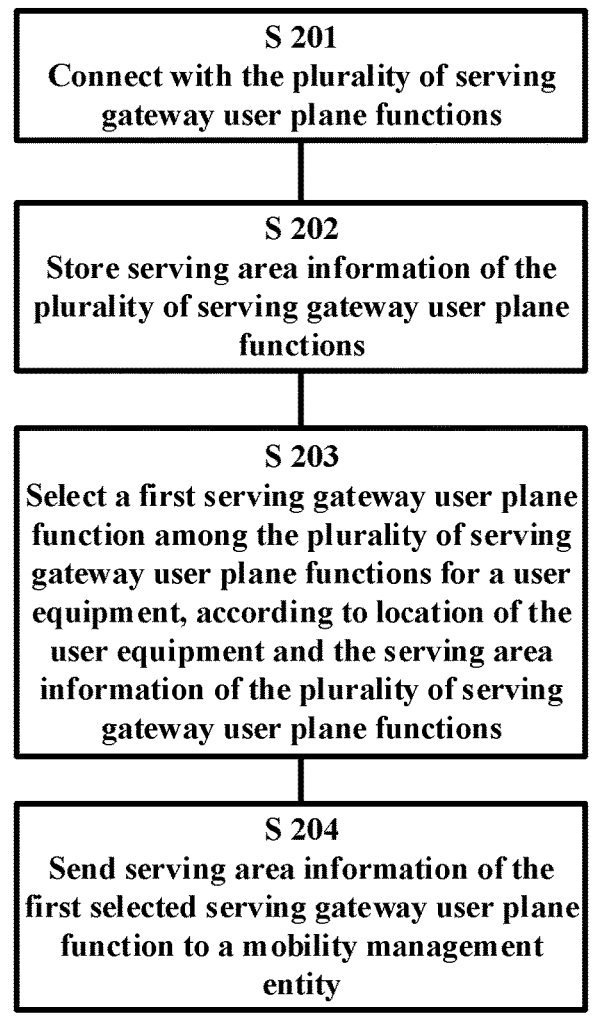
FIG. 2 is an exemplary flow chart of a method for a serving gateway control plane function to manage a plurality of serving gateway user plane functions in accordance with some embodiments.

FIG. 2 is an exemplary flow chart of a method for a serving gateway control plane function to manage a plurality of serving gateway user plane functions in accordance with some embodiments.

As shown in FIG. 2, the method includes: step S201, connecting with the plurality of serving gateway user plane functions; step S202, storing serving area information of the plurality of serving gateway user plane functions; step S203, selecting a first serving gateway user plane function among the plurality of serving gateway user plane functions for a user equipment, according to location of the user equipment and the serving area information of the plurality of serving gateway user plane functions; and step S204, sending serving area information of the first serving gateway user plane function to a mobility management entity.

The serving gateway control plane function (SGW-C) may manage the plurality of serving gateway user plane functions (SGW-U) in CUPS manner, without SGW-C partitions. SGW-C needs not to be updated just for a specific purpose. The cost-efficiency is improved.

Figure 3:
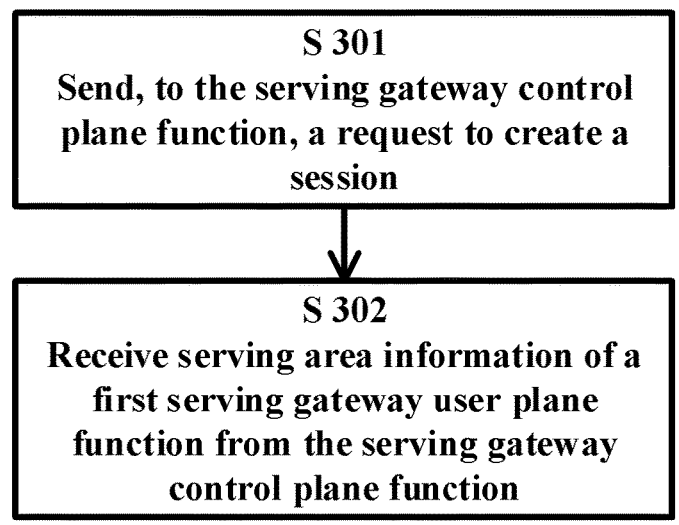
FIG. 3 is an exemplary flow chart of a method for a mobility management entity to communicate with a serving gateway control plane function managing a plurality of serving gateway user plane functions in accordance with some embodiments.

FIG. 3 is an exemplary flow chart of a method for a mobility management entity to communicate with a serving gateway control plane function managing a plurality of serving gateway user plane functions in accordance with some embodiments.

The method includes: step S301, sending, to the serving gateway control plane function, a request to create a session; and step S302, receiving serving area information of a first serving gateway user plane function from the serving gateway control plane function. Corresponding to the method shown in FIG. 2, the serving gateway control plane function selects the first serving gateway user plane function among the plurality of serving gateway user plane functions for a user equipment, according to location of the user equipment and the serving area information of the plurality of serving gateway user plane functions.

After the first serving gateway user plane function is selected, the serving area information of a first serving gateway user plane function is sent to the mobility management entity (MME). The MME directly communicates with the SGW-U, without need to communicate with SGW-U partitions. Communication resources are saved.

Figure 4:
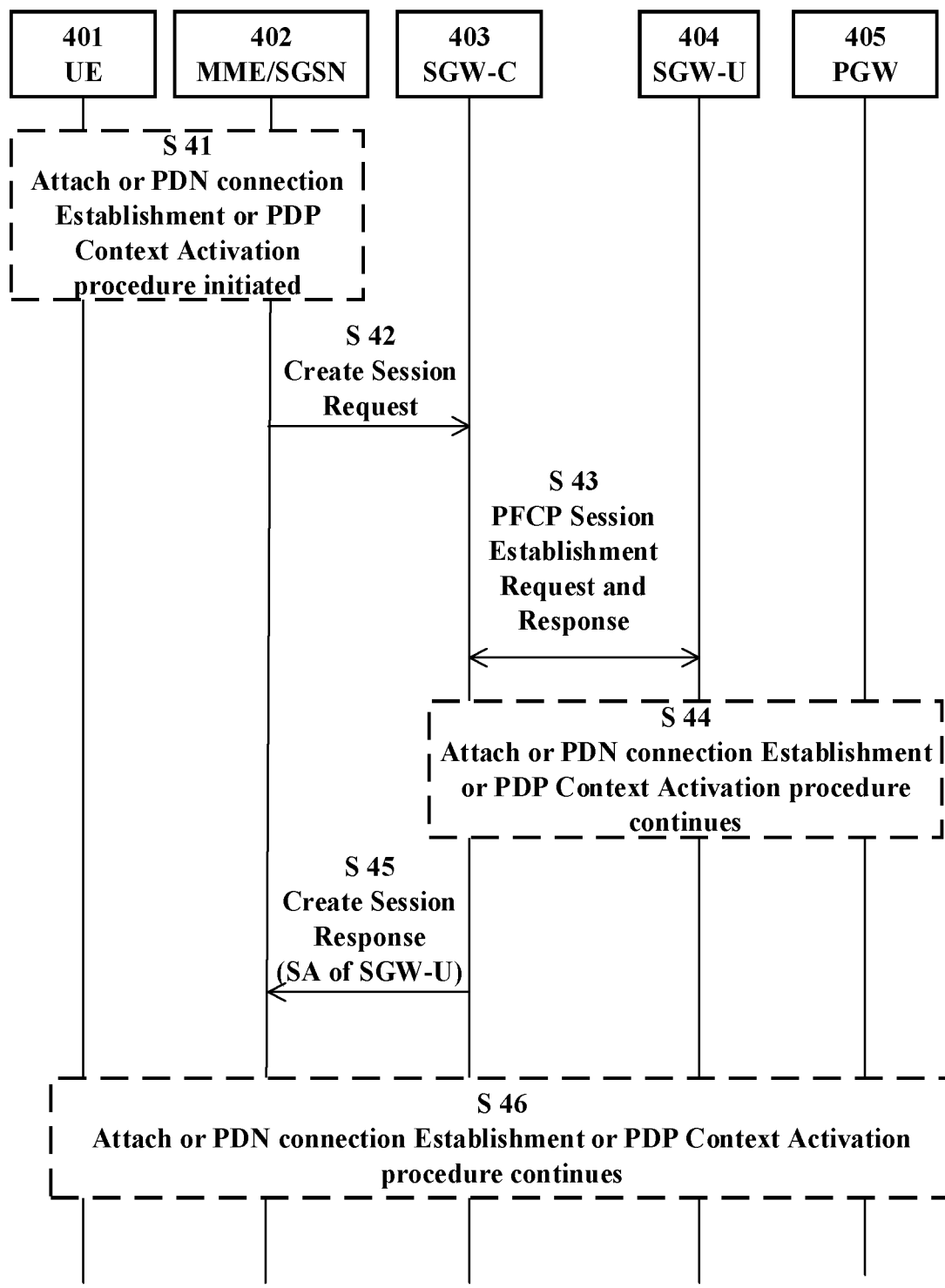
FIG. 4 is a procedure schematic showing a first embodiment of the method in accordance with some embodiments.

FIG. 4 is a procedure schematic showing a first embodiment of the method in accordance with some embodiments. FIG. 4 shows a procedure of a packet data network (PDN) connection establishment.

In step S41, the UE 401 communicates with MME 402 (or SGSN), to initiate an attach or a PDN connection establishment or a packet data protocol (PDP) context activation procedure. SGSN means serving GPRS support node. GPRS means general packet radio service. In step S42, the MME 402 sends a create session request to SGW-C 403. In step S43, SGW-C 403 selects the SGW-U 404 based on UE's location and initiates the packet forwarding control protocol (PFCP) session establishment procedure towards the SGW-U. In step S44, the Attach or PDN Connection Establishment or PDP Context Activation procedure continues in SGW-C 403, SGW-U 404, and a packet data network gateway (PGW) 405. The PGW may also include a control plane function PGW-C and a user plane function PGW-U. In step S45, SGW-C 403 sends a create session response to MME 402. In the message, information about serving area (SA) of SGW-U 404 is additionally included. In step S46, the MME 402 stores the information about SA of SGW-U and the attach or PDN connection establishment or PDP context activation procedure continues.

In embodiments of the present disclosure, as shown in FIG. 4, the serving area information of the first serving gateway user plane function (SGW-U 404) is sent in a create session response message.

In embodiments of the present disclosure, the serving area information of a serving gateway user plane function may include a list of tracking areas served by the serving gateway user plane function, as shown in FIG. 1. Then, as the procedure shown in FIG. 4, the mobility management entity may build a tracking area list for the user equipment, based on the serving area information of the serving gateway user plane function, when the procedure continues.

Figure 5:
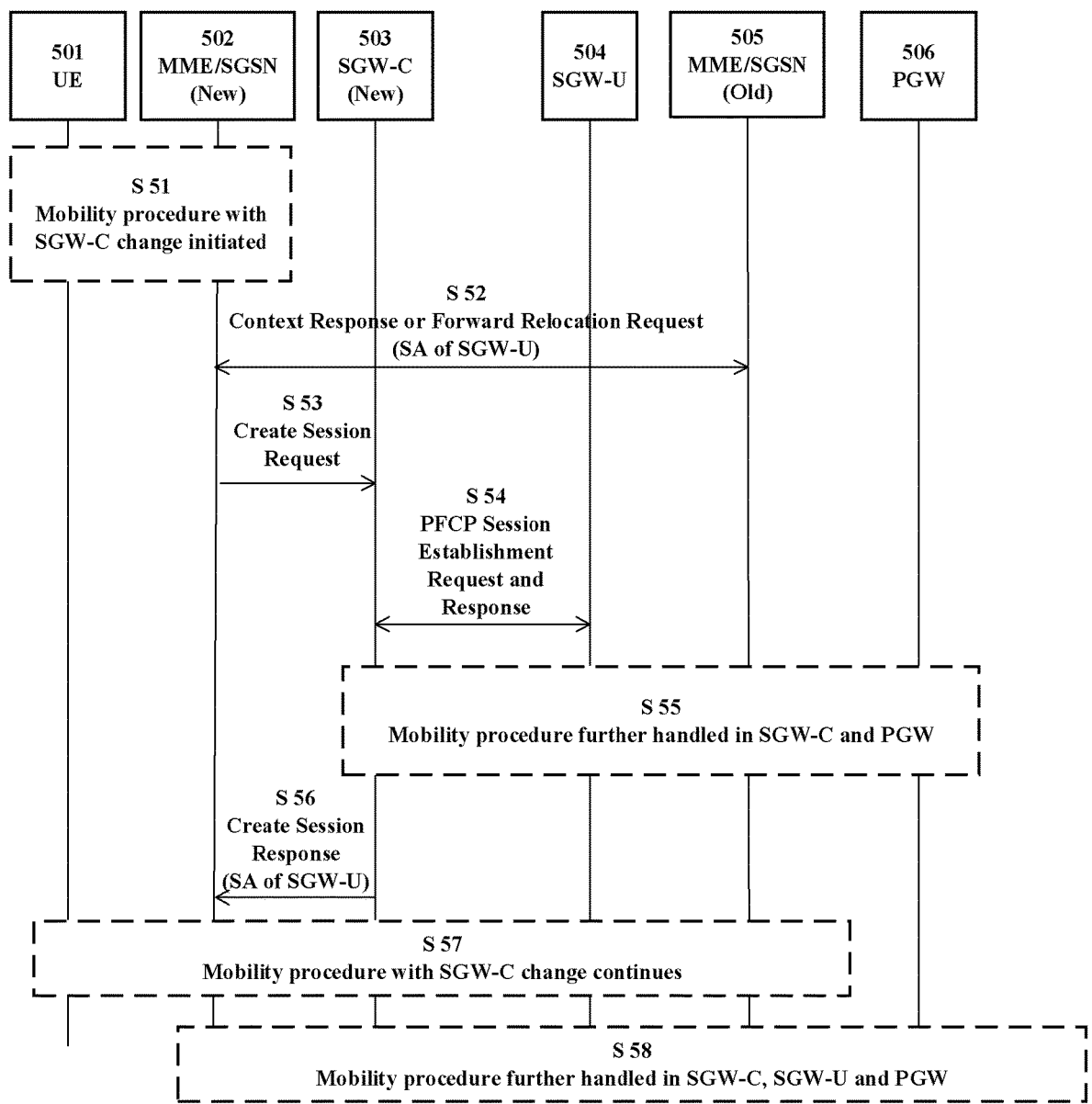
FIG. 5 is a procedure schematic showing a second embodiment of the method in accordance with some embodiments.

FIG. 5 is a procedure schematic showing a second embodiment of the method in accordance with some embodiments. FIG. 5 shows a procedure of mobility procedure with SGW-C change.

In step S51, a mobility procedure with change to a new SGW-C 503 is initiated. The mobility procedure may be either an IDLE mobility or a handover procedure. In step S52, when MME (or SGSN) has changed, the old MME 505 includes the SGW-U serving area (SA of SWG-U) information in the context response or forward relocation request message sent to new MME 502. In step S53, new MME 502 sends create session request to new SGW-C 503. In step S54, SGW-C 503 selects the SGW-U 504, based on UE's location and initiates the PFCP session establishment procedure towards the SGW-U 504. In step S55, for idle mobility procedure or handover procedure wherein core network is not involved in preparation phase (e.g. X2-based handover, X2 is interface between eNodeBs), SGW-C 503 sends modify bearer request to PGW 506. The procedure is further handled in PGW 506. For other handover procedure where core network is involved in preparation phase (e.g. S1-based handover and inter-radio access technology (RAT) handover), PGW 506 is involved in step S58. S1 is interface between the radio access network (RAN) and evolved packet core. In step S56, SGW-C 503 sends create session response to MME 502. In the message, SGW-U serving area information is additionally included. In step S57, MME 502 stores the SGW-U serving area information and the mobility procedure continues. MME 502 takes the SGW-U serving area into consideration when building TA list for the UE 501. In step S58, for handover procedure where core network is involved in preparation phase (e.g. S1-basd handover and inter-RAT handover), MME 502 sends modify bearer request to SGW-C and then to PGW and the procedure is further handled.

As another exemplary embodiment, a session management function (SMF), instead of SGW-C, may send a user plane function (UPF) serving area information, instead of SGW-U serving area, to an access management function (AMF), instead of MME. The UPF serving area information will facilitate the AMF to build up the registration area for the UE, and when the UE is moving out of UPF serving area, AMF can proactively notify SMF.

Figure 6:
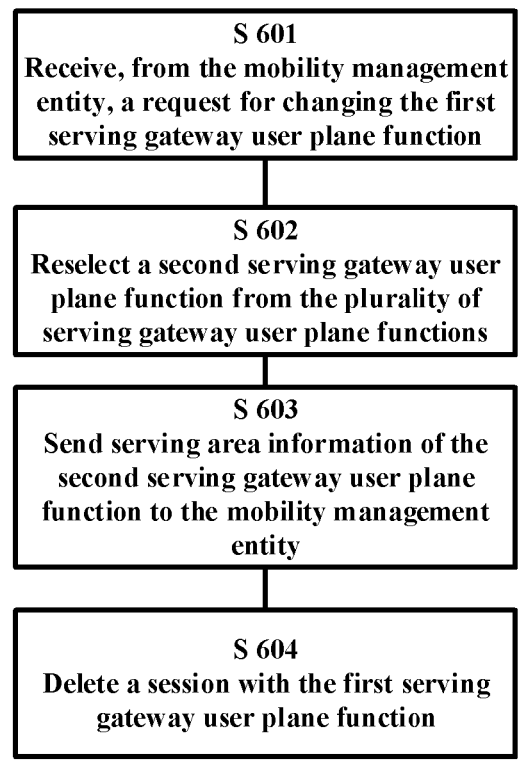
FIG. 6 is an exemplary flow chart showing additional steps of the method in FIG. 2 in accordance with some embodiments.

FIG. 6 is an exemplary flow chart showing additional steps of the method in FIG. 2 in accordance with some embodiments.

As shown in FIG. 6, the method for the SGW-C further includes: step S601, receiving, from the mobility management entity, a request for changing the first serving gateway user plane function; step S602, reselecting a second serving gateway user plane function from the plurality of serving gateway user plane functions; step S603, sending serving area information of the second serving gateway user plane function to the mobility management entity; and step S604, deleting a session with the first serving gateway user plane function.

Figure 7:
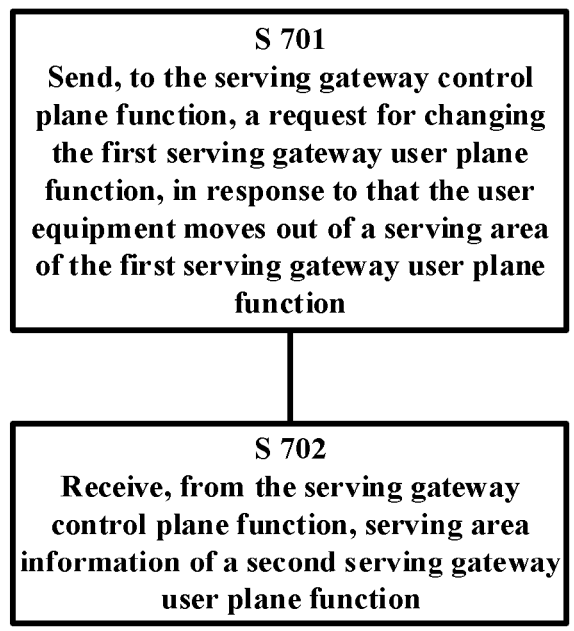
FIG. 7 is an exemplary flow chart showing additional steps of the method in FIG. 3 in accordance with some embodiments.

FIG. 7 is an exemplary flow chart showing additional steps of the method in FIG. 3 in accordance with some embodiments.

As shown in FIG. 7, the method for the MME further includes: step S701, sending, to the serving gateway control plane function, a request for changing the first serving gateway user plane function, in response to that the user equipment moves out of a serving area of the first serving gateway user plane function; and step S702, receiving, from the serving gateway control plane function, serving area information of a second serving gateway user plane function. The second serving gateway user plane function is reselected by the serving gateway control plane function.

In the embodiments, the switch between serving gateway user plane functions managed by the same serving gateway control plane function is efficient, since the serving gateway control plane function needs not to be changed. The procedure and the communication resources are saved.

Figure 8:
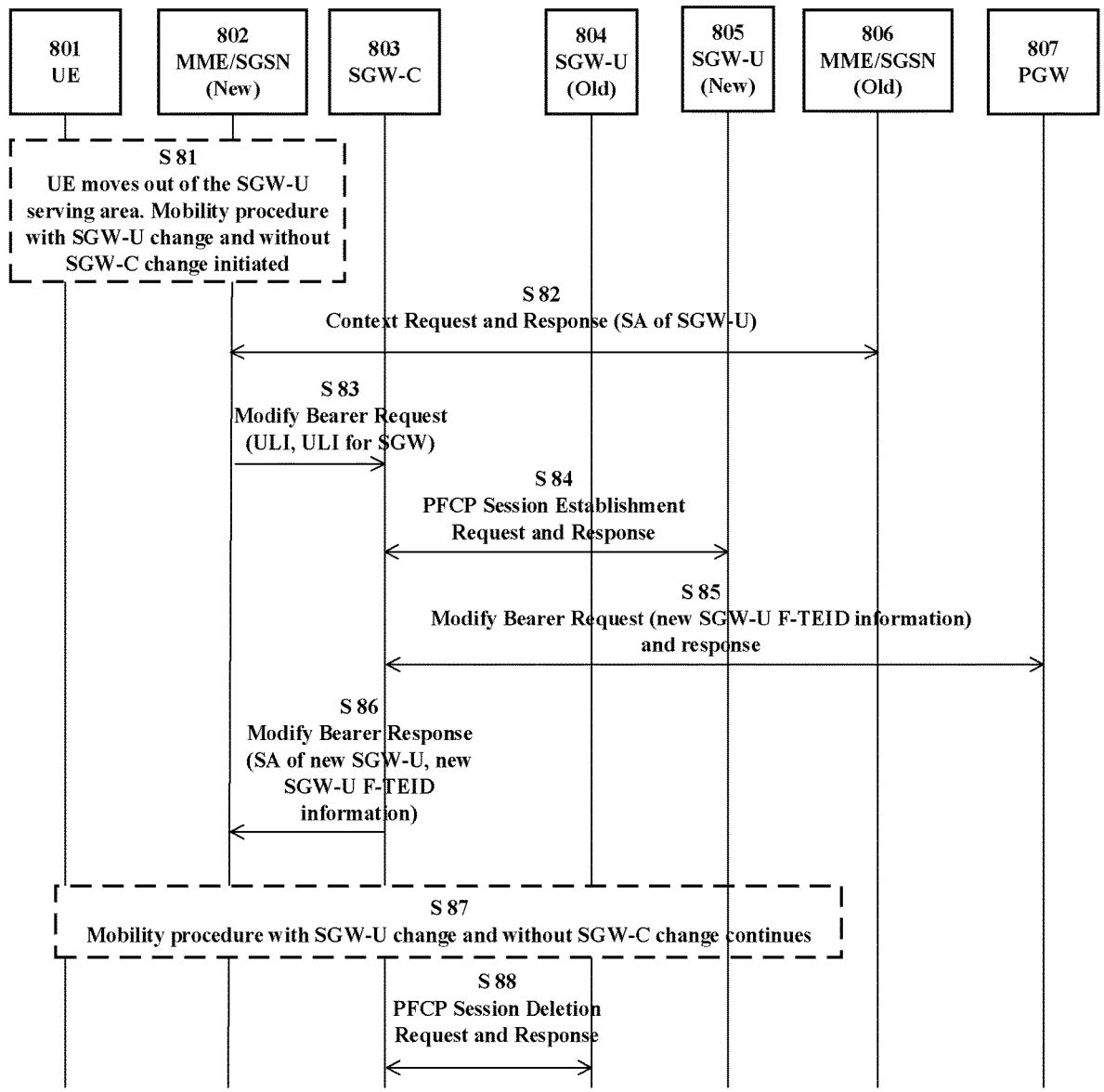
FIG. 8 is a procedure schematic showing a third embodiment of the method in accordance with some embodiments.

FIG. 8 is a procedure schematic showing a third embodiment of the method in accordance with some embodiments. FIG. 8 shows a procedure of an idle mobility.

In step S81, UE 801 moves out the SGW-U serving area of the old SGW-U 804, and a mobility procedure is triggered. The mobility procedure is an idle mobility. In step S82, if the MME (or SGSN) has changed, the old MME 806 includes the SGW-U serving area information in the context response message sent to new MME 802. In step S83, either due to that UE 801 has moved out of the SGW-U serving area or due to other reasons (e.g., MME change or user location information (ULI) is requested to be reported), MME sends modify bearer request to SGW-C 803. In the message, if ULI is not included, ULI for SGW is included to help SGW-C to reselect the SGW-U. In step S84, since the current SGW-U 804 cannot serve the UE any more, SGW-C 803 reselects another SGW-U 805 based on UE's new location and initiates the PFCP session establishment procedure towards SGW-U. In step S85, since SGW-U is changed, SGW-C 803 sends modify bearer request to PGW 807. In this message, new SGW-U F-TEID information is included. F-TEID means fully qualified tunnel endpoint identifier. In step S86, SGW-C 803 sends modify bearer response to MME 802. In this message, new SGW-U serving area and new SGW-U F-TEID information are included. In step S87, MME 802 stores the new SGW-U serving area and the new SGW-U F-TEID information and the mobility procedure continues. MME 802 takes the SGW-U serving area into consideration when building TA list for the UE 801. In step S88, SGW-C 803 deletes the old PFCP session associated with the old SGW-U 804 by initiating the PFCP session deletion procedure.

In the embodiment, the old SGW-U 804 is the first SGW-U and the new SGW-U 805 is the second SGW-U.

In the embodiments, the request for changing the first serving gateway user plane function is a modify bearer request as in step S83. The serving area information of the second serving gateway user plane function is sent in a modify bearer response message as in S86. The modify bearer request may include user location information, and the user location information may include the change of the location, the current location, etc. The step S604 in FIG. 6 may include: sending a packet forwarding control plane session deletion request to the first serving gateway user plane function; and receiving a packet forwarding control plane session deletion response from the first serving gateway user plane function, as in step S88.

In the embodiments, the mobility management entity is changed, the old MME 806 sends the serving area information of the first or the second serving gateway user plane function to the new MME 802. The serving area information of the first or the second serving gateway user plane function is sent in a context response or a forward relocation request.

Figure 9:
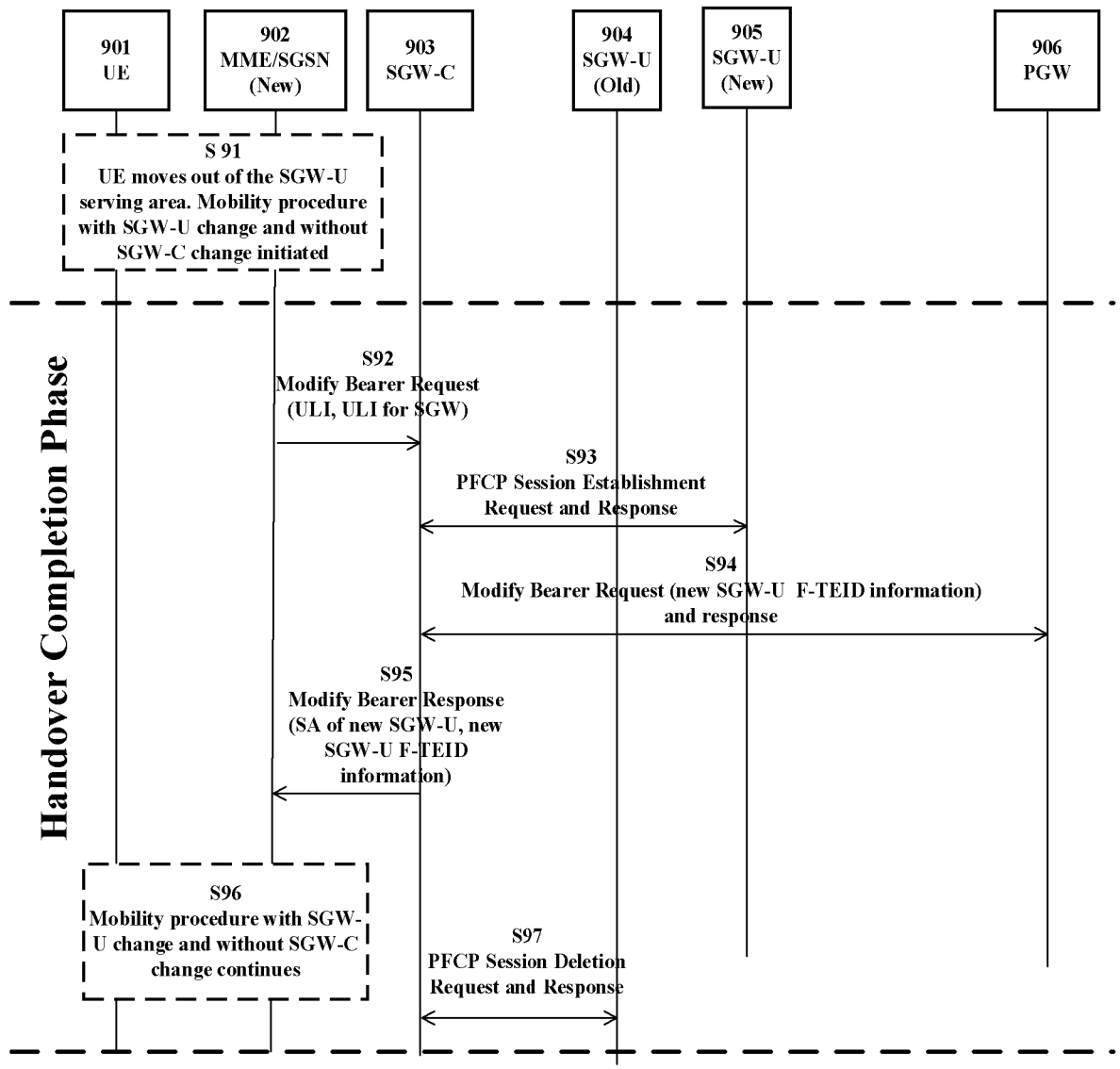
FIG. 9 is a procedure schematic showing a fourth embodiment of the method in accordance with some embodiments.

FIG. 9 is a procedure schematic showing a fourth embodiment of the method in accordance with some embodiments. FIG. 9 shows a handover procedure wherein core network is involved in a completion phase, rather than preparation phase.

In step S91, UE 901 moves out the SGW-U serving area and mobility procedure is triggered. The mobility procedure is handover procedure where core network is not involved in preparation phase (e.g. X2-based handover procedure). The preparation and execution procedure are performed by RAN and UE. In step S92, during handover completion phase, MME 902 sends a modify bearer request to SGW-C 903. In the message, if ULI is not included, ULI for SGW is included to help SGW-C to reselect the SGW-U. In step S93, since the old SGW-U 904 cannot serve the UE 901 any more, SGW-C 903 reselects another SGW-U 905 based on UE's new location and initiates the PFCP session establishment procedure towards SGW-U 905. In step S94, since SGW-U is changed, SGW-C 903 sends a modify bearer request to PGW 906. In this message, new SGW-U F-TEID information is included. In step S95, SGW-C 903 sends a modify bearer response to MME 902. In this message, new SGW-U serving area and new SGW-U F-TEID information are included. In step S96, MME 902 stores the new SGW-U serving area and the new SGW-U F-TEID information and the mobility procedure continues. MME 902 takes the SGW-U serving area into consideration when building TA list for the UE 901. In step S97, SGW-C 903 deletes the old PFCP session associated with the old SGW-U 904 by initiating the PFCP session deletion procedure.

In the embodiments, MME 902 sends an indication of to notify a packet data network gateway to the serving gateway control plane function, in response to that the reselection of the second serving gateway user plane function happens during an idle mode mobility procedure, or during a completion phase of a handover procedure. The serving gateway control plane function notify the packet data network gateway by the modify bearer request as in S94.

Figure 10:
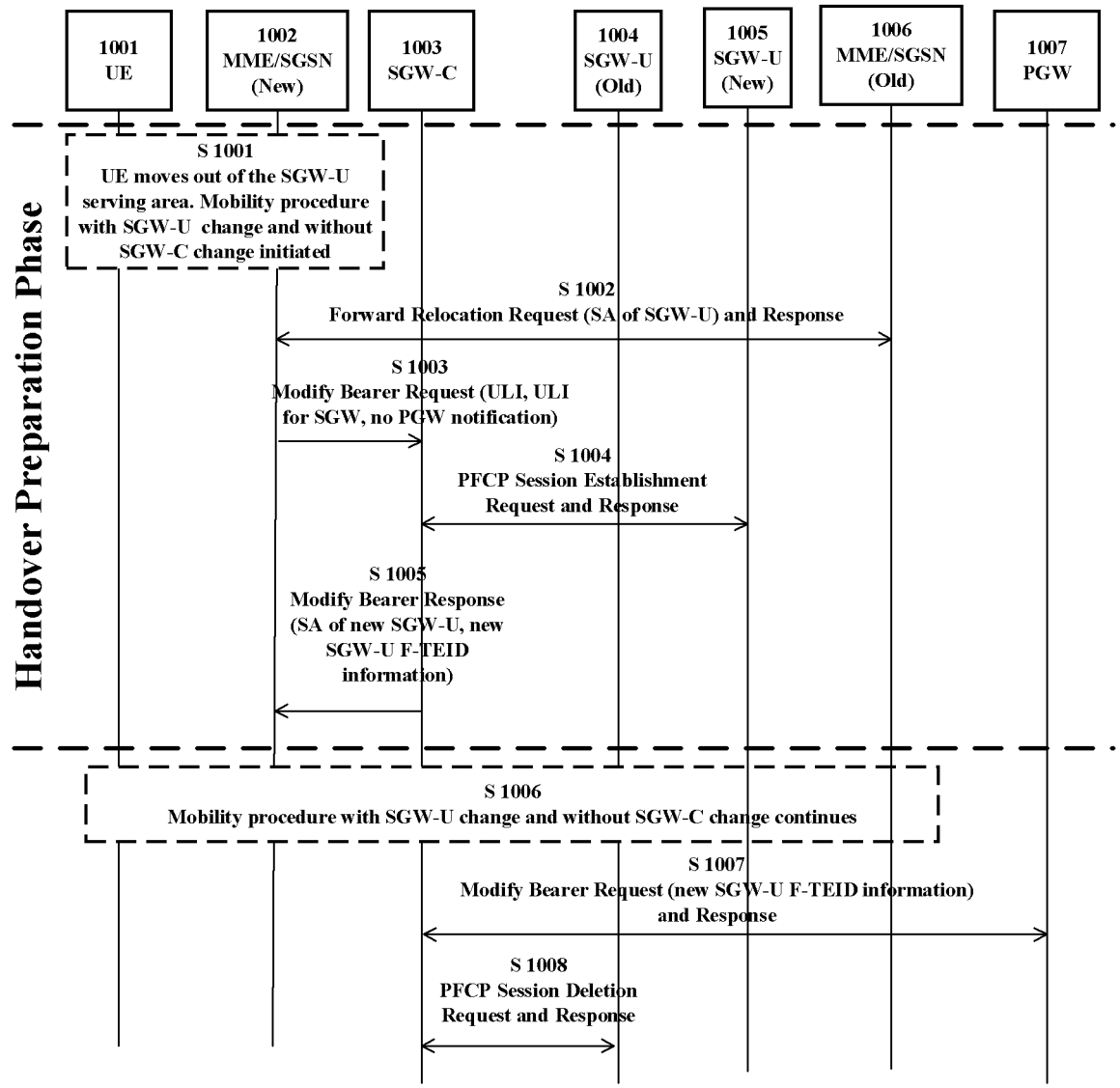
FIG. 10 is a procedure schematic showing a fifth embodiment of the method in accordance with some embodiments.

FIG. 10 is a procedure schematic showing a fifth embodiment of the method in accordance with some embodiments. FIG. 10 shows a handover procedure where core network is involved in preparation phase.

In step 1001, UE 1001 moves out the old SGW-U 1004 serving area and mobility procedure is triggered. The mobility procedure is the handover procedure where core network is involved in preparation phase (e.g. S1-based handover or inter-RAT handover). In step 1002, if SGSN/MME has changed, in the preparation phase, the old SGSN/MME 1006 includes the SGW-U serving area information in the Forward Relocation Request message sent to new SGSN/MME 1002.

In step 1003, since UE 1001 has moved out of the SGW-U 1004 serving area, before SGSN/MME 1002 sends message to RAN side to prepare the resource, SGSN/MME 1002 firstly sends modify bearer request to SGW-C 1003 so that SGW-C 1003 can reselect the SGW-U 1005 to serve the UE 1001. In the message, if ULI is not included, ULI for SGW is included to help SGW-C to reselect the SGW-U. An indication of "no PGW notification" is also included so that SGW-C 1003 will not forward the modify bearer request to PGW 1007. In step 1004, since the old SGW-U 1004 cannot serve the UE 1001 any more, SGW-C 1003 reselects another SGW-U 1005 based on UE's new location and initiates the PFCP session establishment procedure towards SGW-U 1005. In step 1005, SGW-C 1003 sends modify bearer response to SGSN/MME 1002. In this message, new SGW-U serving area and new SGW-U F-TEID information are included. In step 1006, SGSN/MME 1002 stores the new SGW-U serving area and the new SGW-U F-TEID information. MME 1002 takes the SGW-U 1005 serving area into consideration when building TA list for the UE 1001. In step 1007, the mobility procedure continues and when the UE 1001 has moved to the target area, MME 1002 sends another modify bearer request to SGW-C 1003. Upon receiving modify bearer request, since SGW-U is successfully changed, SGW-C 1003 sends modify bearer request to PGW 1007. In this message, new SGW-U F-TEID information is included. In step 1008, SGW-C 1003 deletes the old PFCP session associated with the old SGW-U 1004 by initiating the PFCP session deletion procedure.

In the embodiment, the MME 902 sends an indication of not to notify a packet data network gateway to the serving gateway control plane function, in response to that the reselection of the second serving gateway user plane function happens during a preparation phase of a handover procedure. The indication (no PGW notification) is included in the modify bearer request as in S1003, and any kind of flag or identifier may be used. After SGW-U is successfully changed, SGW-C 1003 sends modify bearer request to PGW 1007, to notify PGW 1007.

In embodiments of the present disclosure, no partition is needed in the SGW-C. Embodiments of the present disclosure problems avoid problems, such as coupling of SGW-C and SGW-U, implementation complexity in SGW-C, SGW-C CAPEX and OPEX increment, and extra signaling in network.

FIG. 11 is a block diagram showing the serving gateway control plane function and the mobility management entity in accordance with some embodiments.

As shown in FIG. 11, a serving gateway control plane function device 1101 to manage a plurality of serving gateway user plane functions, may include: a processor 1103; and a memory 1104. The memory 1104 contains instructions executable by the processor 1103. The serving gateway control plane function device 1101 is operative to the method described above, such as the methods shown in FIGS. 2, 6.

As shown in FIG. 11, a mobility management entity device 1102 to communicate with a serving gateway control plane function managing a plurality of serving gateway user plane functions, may include: a processor 1105; and a memory 1106. The memory 1106 contains instructions executable by the processor 1105. The mobility management entity device 1102 is operative to the method described above, such as the methods shown in FIGS. 3, 7.

The embodiments of the present disclosure further provides a computer readable storage medium having a computer program stored thereon. The computer program is executable by a device to cause the device to carry out the method described above, such as the methods shown in FIGS. 2, 3, 6, 7.

In FIG. 11, the processor 1103 and the processor 1105 may be any kind of processing component, such as one or more microprocessor or microcontrollers, as well as other digital hardware, which may include digital signal processors (DSPs), special-purpose digital logic, and the like. The memory 1104 and the memory 1106 may be any kind of storage component, such as read-only memory (ROM), random-access memory, cache memory, flash memory devices, optical storage devices, etc.

FIG. 12 is a schematic showing virtualization apparatus for SGW-C in accordance with some embodiments.

As shown in FIG. 12, virtual apparatus 1200 for SGW-C includes a connection unit 1201, a storage unit 1202, a selection unit 1203, and a communication unit 1204. Taking the method in FIG. 2 as an example, the connection unit 1201 may perform step S201. The storage unit 1202 may perform step S202. The selection unit 1203 may perform step S203. The communication unit 1201 may further perform step S204.

FIG. 13 is a schematic showing virtualization apparatus for MME accordance with some embodiments. As shown in FIG. 13, virtual apparatus 1300 for MME includes a communication unit 1301. Taking the method in FIG. 3 as an example, the communication unit 1301 may perform step S301 and S302.

With virtual apparatus 1200 and 1300, the SGW-C and MME may not need fixed processor or memory, any computing resource and storage resource may be arranged form at least one node device in the network. The introduction of virtualization technology and network computing technology may improve the usage efficiency of the network resources and the flexibility of the network.

Figure 14:
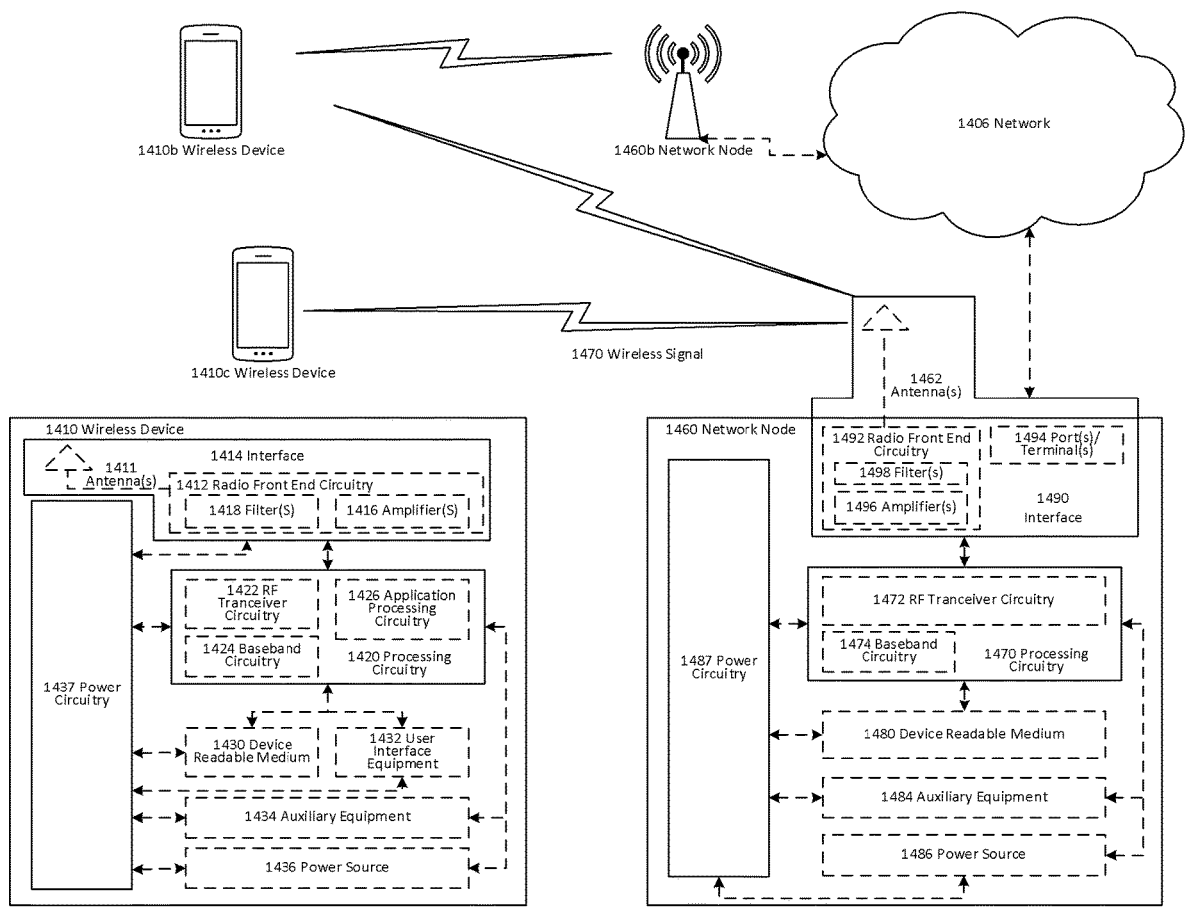
FIG. 14 is a schematic showing a wireless network in accordance with some embodiments.

FIG. 14 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460b, and WDs 1410, 1410b, and 1410c. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio.

Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, M_MEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIG. 14 that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality may include providing any of the various wireless features or benefits discussed herein. For example, processing circuitry 1420 may execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1430, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410, and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network, and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
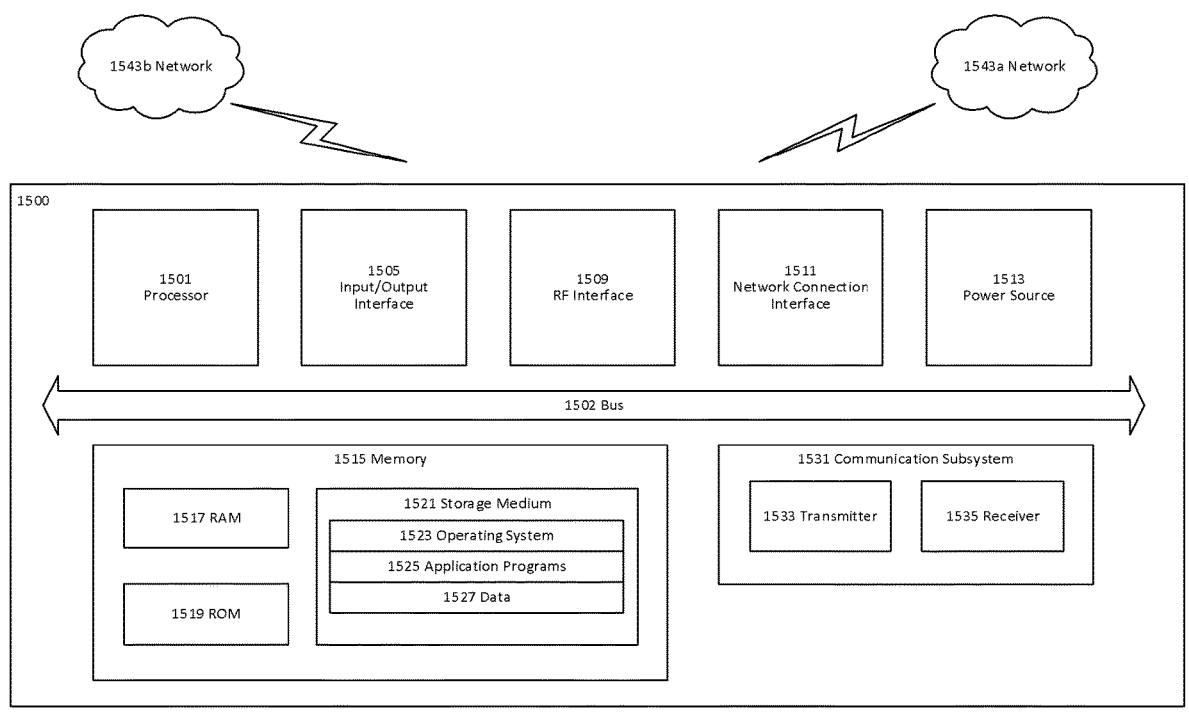
FIG. 15 is a schematic showing a user equipment in accordance with some embodiments.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 15200 may be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network 1543a. Network 1543a may encompass wired and/or wireless networks such as a local-area network (LAN), a wide-area network (WAN), a computer network, a wireless network, a telecommunications network, another like network or any combination thereof. For example, network 1543a may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511 may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HODS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to off-load data, or to upload data. An article of manufacture, such as one utilizing a communication system may be tangibly embodied in storage medium 1521, which may comprise a device readable medium.

In FIG. 15, processing circuitry 1501 may be configured to communicate with network 1543b using communication subsystem 1531. Network 1543a and network 1543b may be the same network or networks or different network or networks. Communication subsystem 1531 may be configured to include one or more transceivers used to communicate with network 1543b. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535 of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network 1543b may encompass wired and/or wireless networks such as a local-area network (LAN), a wide-area network (WAN), a computer network, a wireless network, a telecommunications network, another like network or any combination thereof. For example, network 1543b may be a cellular network, a Wi-Fi network, and/or a near-field network. Power source 1513 may be configured to provide alternating current (AC) or direct current (DC) power to components of UE 1500.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
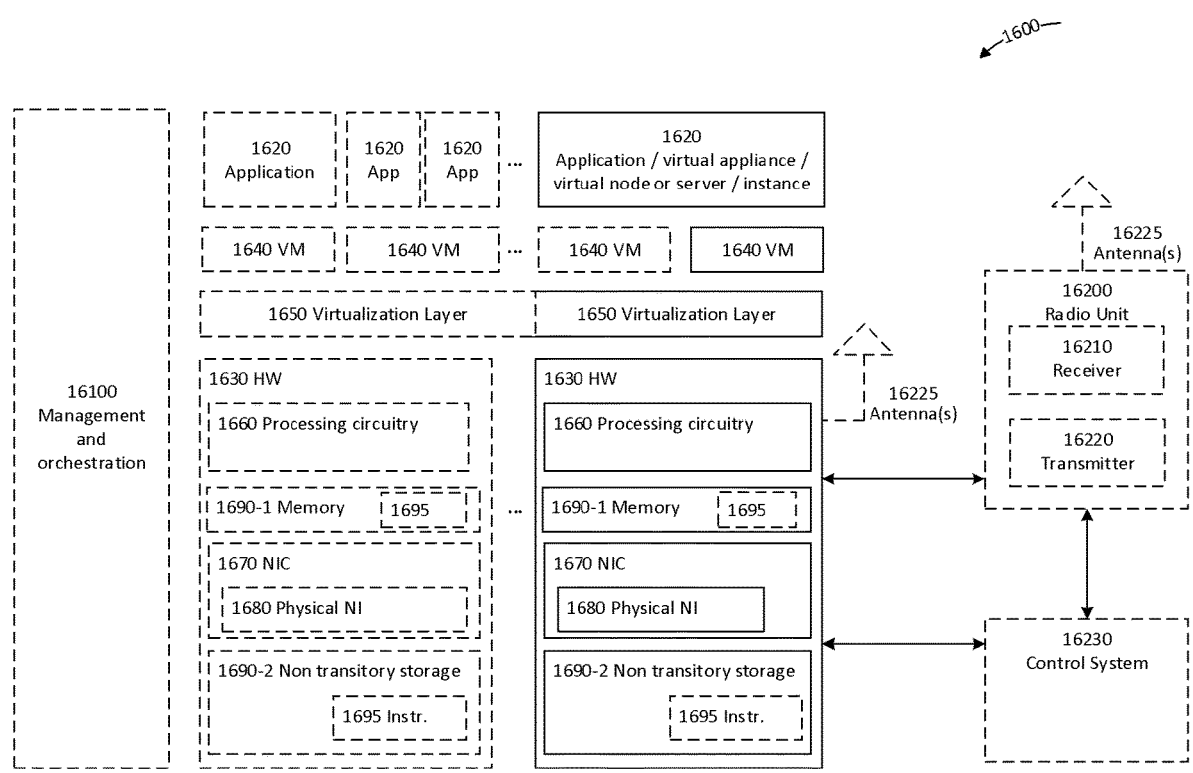
FIG. 16 is a schematic showing a virtualization environment in accordance with some embodiments.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be effected with the use of control system 16230 which may alternatively be used for communication between the hardware nodes 1630 and radio units 16200.

Figure 17:
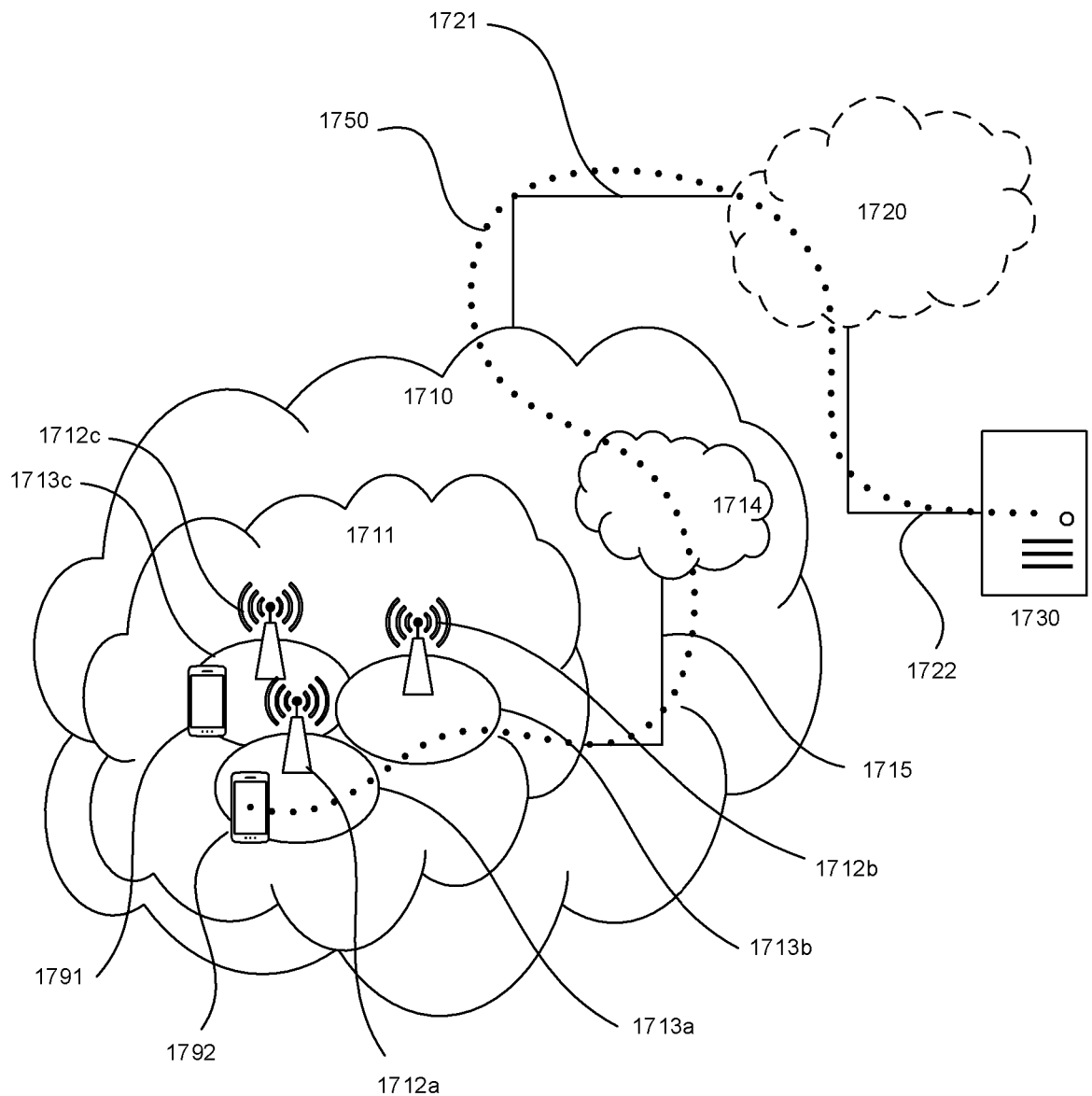
FIG. 17 is a schematic showing a telecommunication network connected via an intermediate network to a host computer in accordance with some embodiments.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712a, 1712b, 1712c, such as NBs, eNBs, gNBs or other types of wireless access points, each defining a corresponding coverage area 1713a, 1713b, 1713c. Each base station 1712a, 1712b, 1712c is connectable to core network 1714 over a wired or wireless connection 1715. A first UE 1791 located in coverage area 1713c is configured to wirelessly connect to, or be paged by, the corresponding base station 1712c. A second UE 1792 in coverage area 1713a is wirelessly connectable to the corresponding base station 1712a. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

Figure 18:
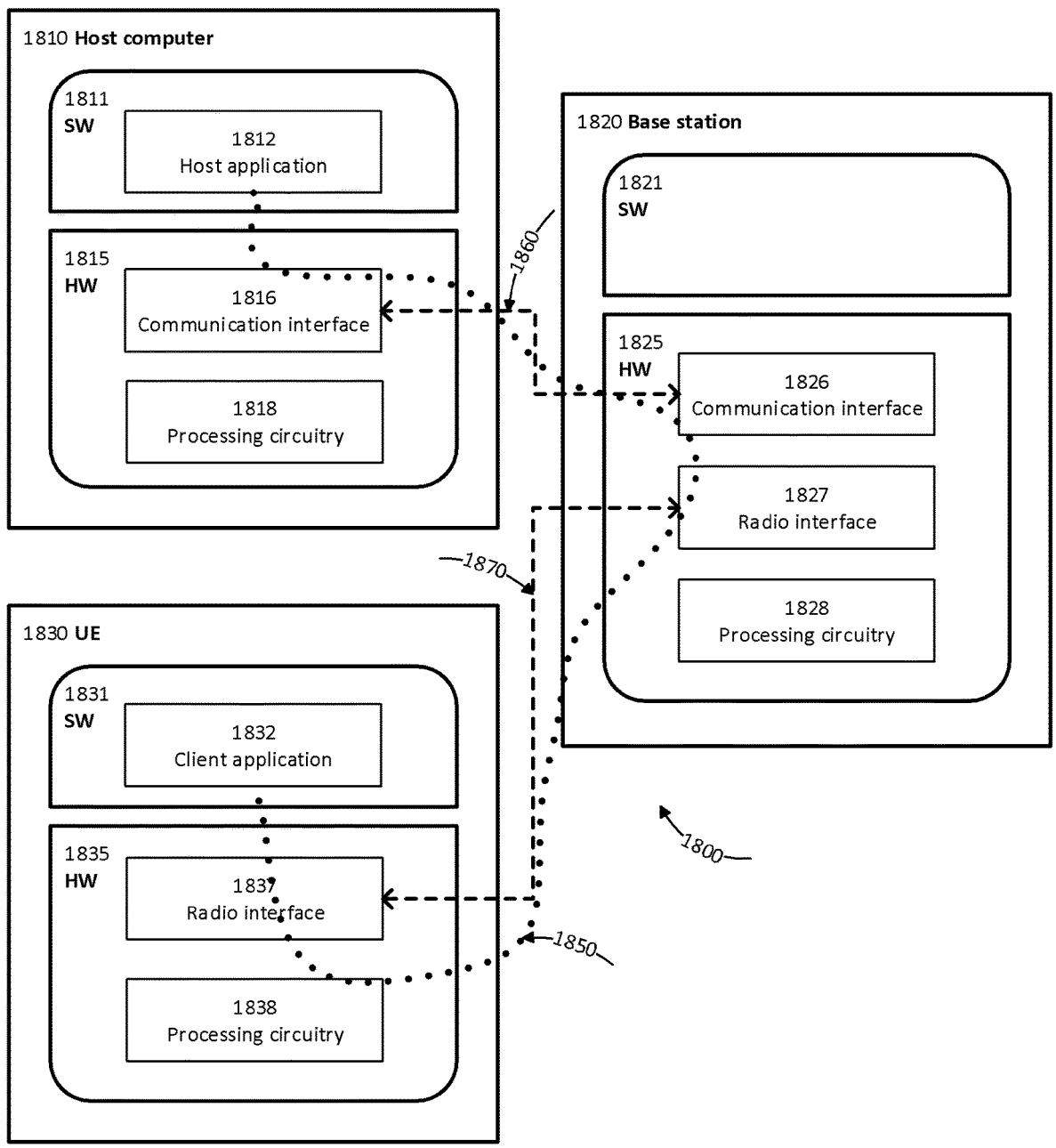
FIG. 18 is a schematic showing a host computer communicating via a base station with a user equipment over a partially wireless connection in accordance with some embodiments.

It is noted that host computer 1810, base station 1820 and UE 1830 illustrated in FIG. 18 may be similar or identical to host computer 1730, one of base stations 1712a, 1712b, 1712c and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may improve the data rate, latency, power consumption, since time and radio resources for managing a plurality of SGW-Us are reduced, and thereby provide benefits such as, reduced user waiting time, and better responsiveness.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
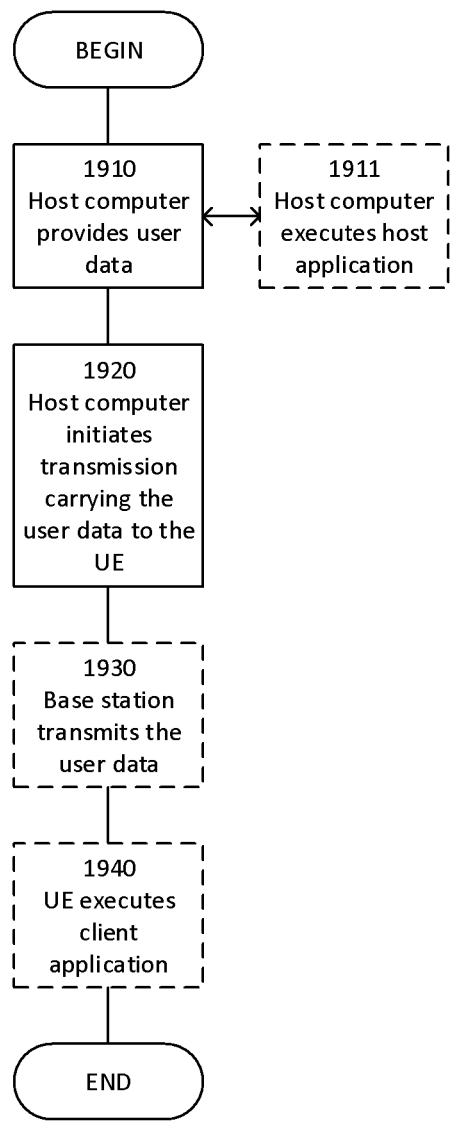
FIG. 19 is a schematic showing methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
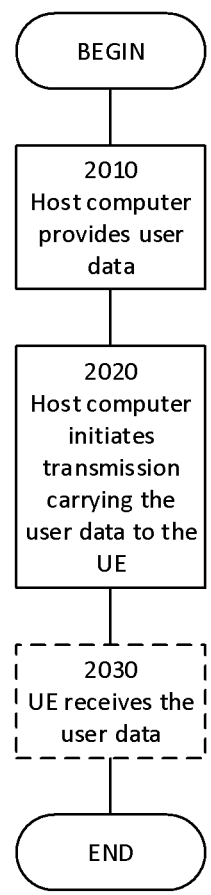
FIG. 20 is a schematic showing methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
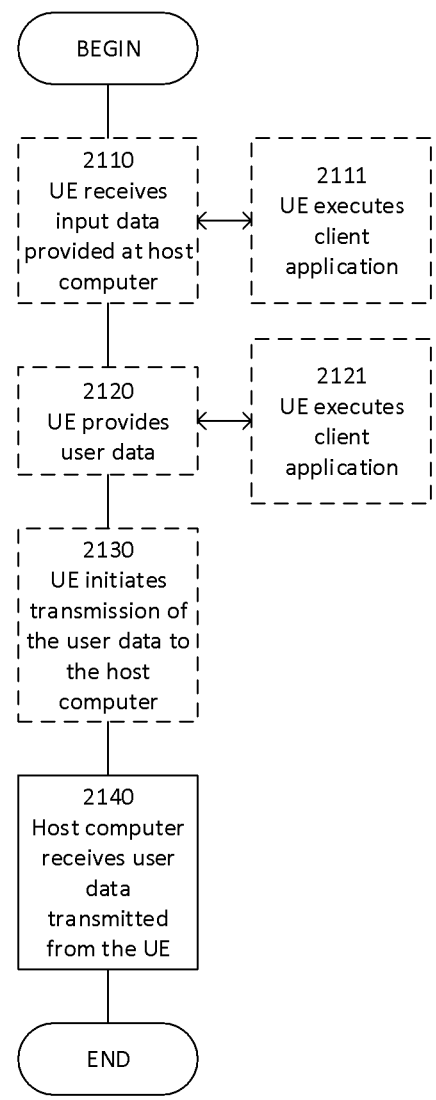
FIG. 21 is a schematic showing methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
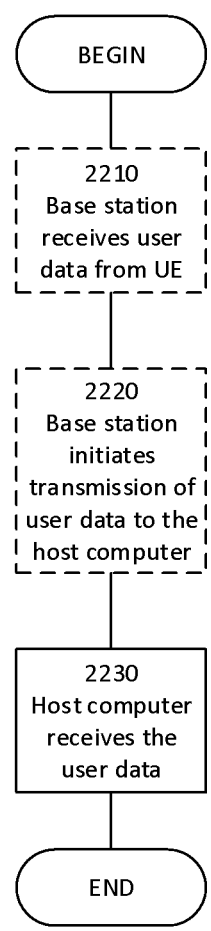
FIG. 22 is a schematic showing methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

In the above mentioned methods and apparatuses, the serving gateway control plane function (SGW-C) may manage the plurality of serving gateway user plane functions (SGW-U) in CUPS manner, without SGW-C partitions. SGW-C needs not to be updated just for a specific purpose. The cost-efficiency is improved. After the first serving gateway user plane function is selected, the serving area information of a first serving gateway user plane function is sent to the mobility management entity (MME). The MME directly communicates with the SGW-U, without need to communicate with SGW-U partitions. Communication resources are saved. Embodiments of the present disclosure problems avoid problems, such as coupling of SGW-C and SGW-U, implementation complexity in SGW-C, SGW-C CAPEX and OPEX increment, and extra signaling in network.

The data rate, latency, power consumption may also be improved, since time and radio resources for managing a plurality of SGW-Us are reduced, and thereby provide benefits such as, reduced user waiting time, better responsiveness. The energy improvement in node equipment and in network level can also be calculated/estimated for the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method for a serving gateway control plane function to manage a plurality of serving gateway user plane functions, the method comprising:
   connecting with the plurality of serving gateway user plane functions;
   storing serving area information of the plurality of serving gateway user plane functions;
   selecting a first serving gateway user plane function among the plurality of serving gateway user plane functions for a user equipment, according to location of the user equipment and the serving area information of the plurality of serving gateway user plane functions; and
   sending serving area information of the first serving gateway user plane function to a mobility management entity;
   receiving from the mobility management entity, a request for changing the first serving gateway user plane function;
   reselecting a second serving gateway user plane function from the plurality of serving gateway user plane functions;
   sending serving area information of the second serving gateway user plane function to the mobility management entity;
   deleting a session with the first serving gateway user plane function; and
   receiving an indication to notify a packet data network gateway from the mobility management entity, in response to the reselection of the second serving gateway user plane function happening during an idle mode mobility procedure.

2. The method according to claim 1,
   wherein the request for changing the first serving gateway user plane function is a modify bearer request;
   wherein the serving area information of the second serving gateway user plane function is sent in a modify bearer response message; and
   wherein deleting a session with the first serving gateway user plane function comprises:
      sending a packet forwarding control plane session deletion request to the first serving gateway user plane function; and
      receiving a packet forwarding control plane session deletion response from the first serving gateway user plane function.

3. The method according to claim 1, wherein the serving area information of the first serving gateway user plane function is sent in a create session response message.

4. The method according to claim 1, wherein the serving area information of a serving gateway user plane function includes a list of tracking areas served by the serving gateway user plane function.

5. A method for a mobility management entity to communicate with a serving gateway control plane function managing a plurality of serving gateway user plane functions, comprising:
   sending, to the serving gateway control plane function, a request to create a session; and
   receiving serving area information of a first serving gateway user plane function from the serving gateway control plane function;
   the serving gateway control plane function selecting the first serving gateway user plane function among the plurality of serving gateway user plane functions for a user equipment, according to location of the user equipment and the serving area information of the plurality of serving gateway user plane functions;
   sending, to the serving gateway control plane function, a request for changing the first serving gateway user plane function, in response to the user equipment moving out of a serving area of the first serving gateway user plane function;
   receiving, from the serving gateway control plane function, serving area information of a second serving gateway user plane function, the second serving gateway user plane function being reselected by the serving gateway control plane function;
   sending the serving area information of one of the first and the second serving gateway user plane function to another mobility management entity, during changing of the mobility management entity communicating with the serving gateway control plane function, the serving area information of one of the first and the second serving gateway user plane function being sent in a forward relocation request; and
   sending an indication of to notify a packet data network gateway to the serving gateway control plane function, in response to the reselection of the second serving gateway user plane function happening during an idle mode mobility procedure.

6. The method according to claim 5,
   wherein the request for changing the first serving gateway user plane function is a modify bearer request;
   wherein the modify bearer request includes user location information; and
   wherein the serving area information of the second serving gateway user plane function is received in a modify bearer response message.

7. The method according to claim 5, further comprising:
   sending an indication of not to notify a packet data network gateway to the serving gateway control plane function, in response to that the reselection of the second serving gateway user plane function happens during a preparation phase of a handover procedure.

8. The method according to claim 7, wherein the handover is one of a S1-based handover and an inter-radio access technology handover.

9. The method according to claim 5, wherein the serving area information of the first serving gateway user plane function is received in a create session response message.

10. The method according to claim 5,
wherein the serving area information of a serving gateway user plane function of the plurality of serving gateway user plane functions includes tracking areas served by the serving gateway user plane function; and
wherein the mobility management entity builds a tracking area list for the user equipment, based on the serving area information of the serving gateway user plane function.

11. A serving gateway control plane function device to manage a plurality of serving gateway user plane functions, the serving gateway control plane function device comprising:
a processor; and
a memory, the memory containing instructions executable by the processor, wherein the serving gateway control plane function device is configured to:
connect with the plurality of serving gateway user plane functions;
store serving area information of the plurality of serving gateway user plane functions;
select a first serving gateway user plane function among the plurality of serving gateway user plane functions for a user equipment, according to location of the user equipment and the serving area information of the plurality of serving gateway user plane functions; and
send serving area information of the first serving gateway user plane function to a mobility management entity;
receive, from the mobility management entity, a request for changing the first serving gateway user plane function;
reselect a second serving gateway user plane function from the plurality of serving gateway user plane functions;
send serving area information of the second serving gateway user plane function to the mobility management entity;
delete a session with the first serving gateway user plane function; and
receive an indication to notify a packet data network gateway from the mobility management entity, in response to the reselection of the second serving gateway user plane function happening during an idle mode mobility procedure.

12. A mobility management entity device to communicate with a serving gateway control plane function managing a plurality of serving gateway user plane functions, the mobility management entity device comprising:
a processor; and
a memory, the memory containing instructions executable by the processor, wherein the mobility management entity device is operative configured to:
send, to the serving gateway control plane function, a request to create a session;
receive serving area information of a first serving gateway user plane function from the serving gateway control plane function; and
the serving gateway control plane function selecting the first serving gateway user plane function among the plurality of serving gateway user plane functions for a user equipment according to location of the user equipment and the serving area information of the plurality of serving gateway user plane functions;
send, to the serving gateway control plane function, a request for changing the first serving gateway user plane function, in response to the user equipment moving out of a serving area of the first serving gateway user plane function;
receive, from the serving gateway control plane function, serving area information of a second serving gateway user plane function, the second serving gateway user plane function being reselected by the serving gateway control plane function; and
send the serving area information of one of the first and the second serving gateway user plane function to another mobility management entity, during changing to the mobility management entity communicating with the serving gateway control plane function, the serving area information of one of the first and the second serving gateway user plane function being sent in a forward relocation request; and
send an indication of to notify a packet data network gateway to the serving gateway control plane function, in response to the reselection of the second serving gateway user plane function happening during an idle mode mobility procedure.

* * * * *